Feb. 2, 1954

F. H. McCORMICK 2,668,222

DOMESTIC APPLIANCE

Filed March 3, 1951

INVENTOR.
Francis H. McCormick
BY
Willits Hardman and Fehr
His Attorneys

Feb. 2, 1954 F. H. McCORMICK 2,668,222
DOMESTIC APPLIANCE
Filed March 3, 1951 5 Sheets-Sheet 2
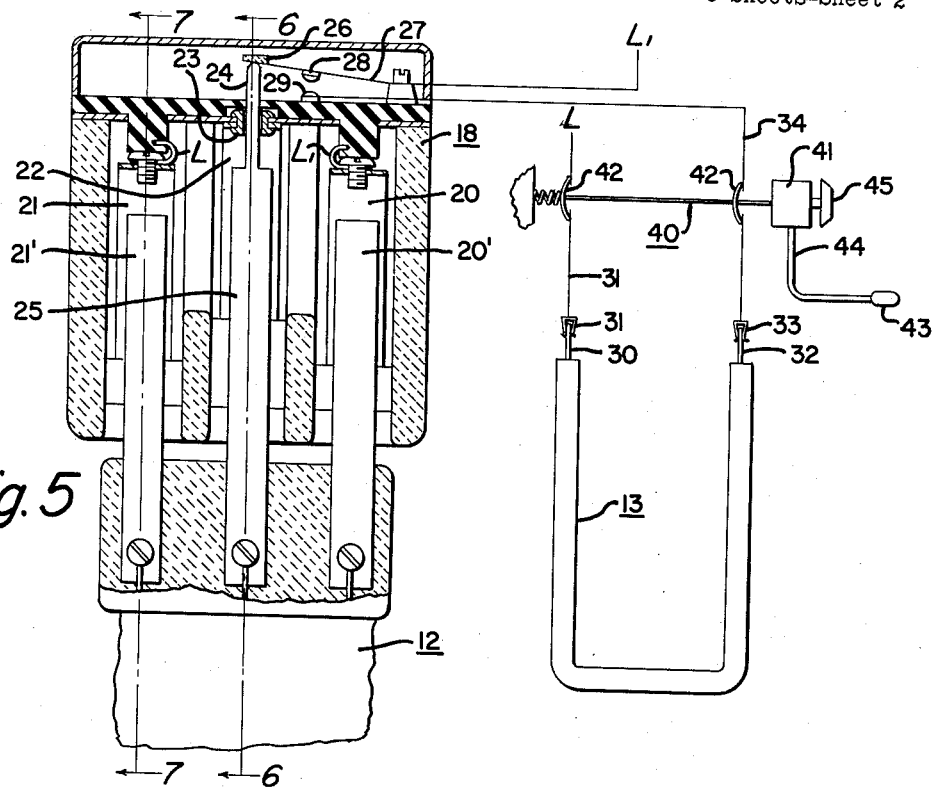
Fig. 5
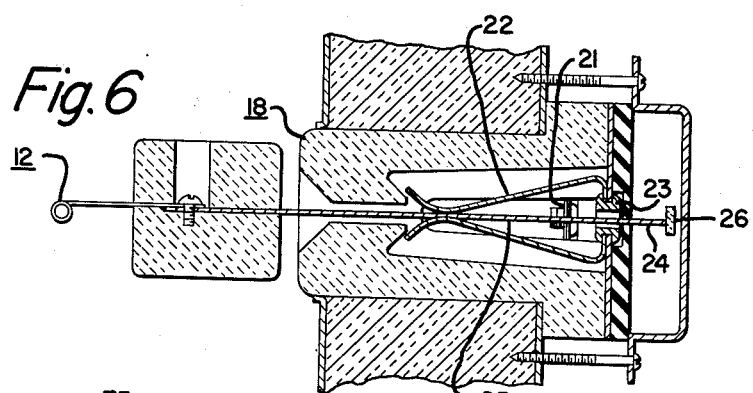
Fig. 6
Fig. 9
Fig. 4
INVENTOR.
Francis H. McCormick
BY Willits Hardman and Fehr
His Attorneys

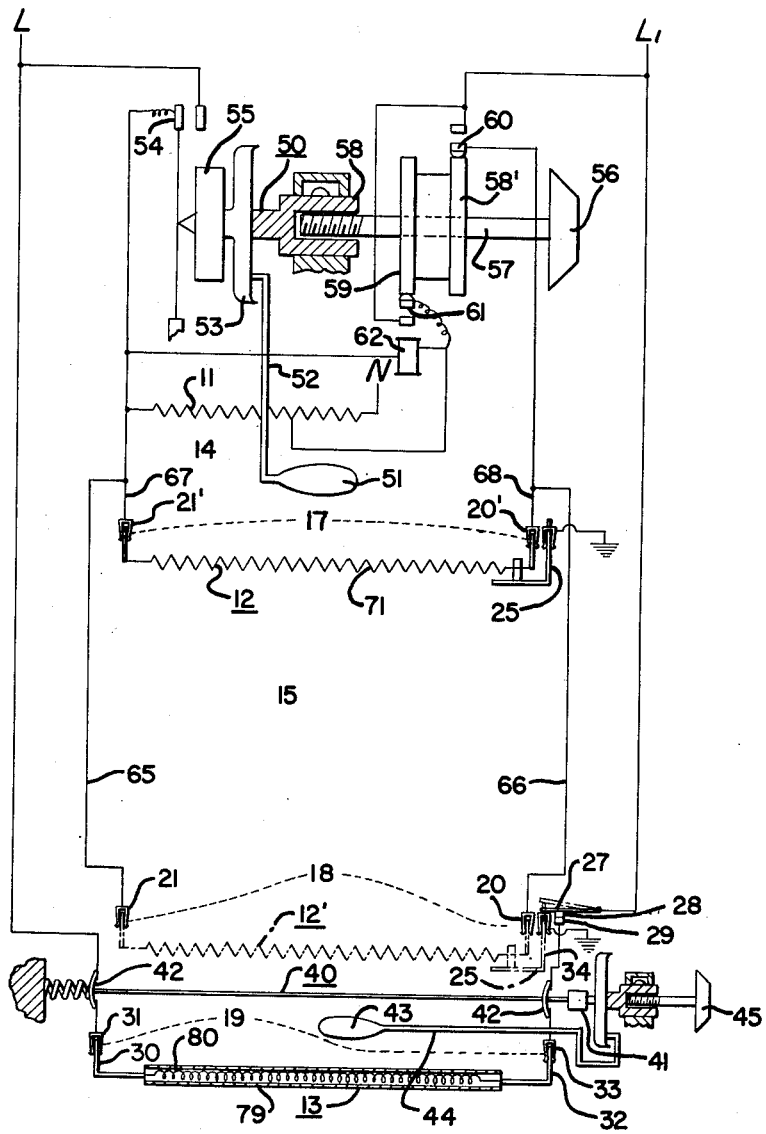

Feb. 2, 1954 F. H. McCORMICK 2,668,222
DOMESTIC APPLIANCE
Filed March 3, 1951 5 Sheets-Sheet 4
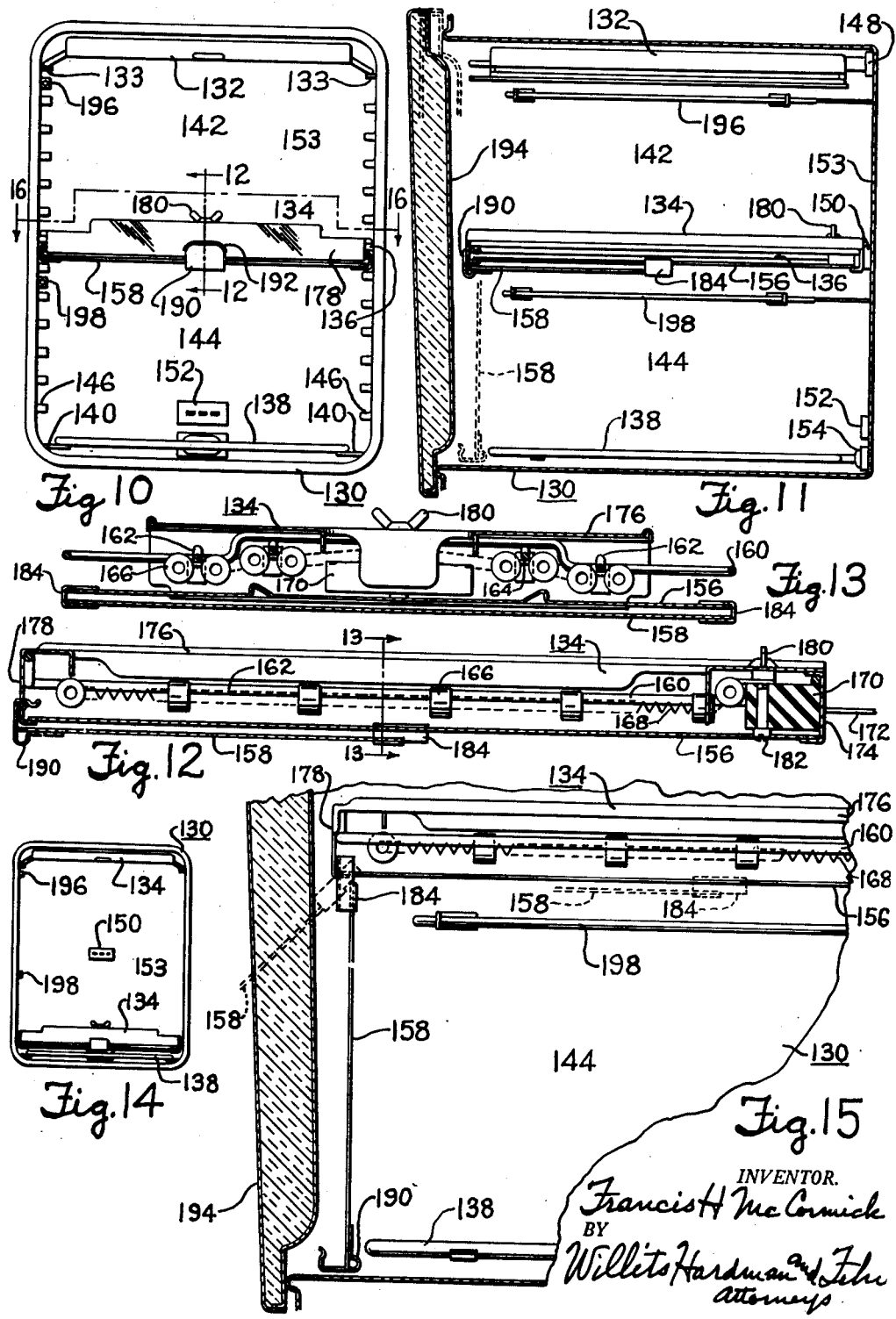
INVENTOR.
Francis H. McCormick
BY
Willets Hardman and Fehr
attorneys Feb. 2, 1954   F. H. McCORMICK   2,668,222
DOMESTIC APPLIANCE
Filed March 3, 1951   5 Sheets-Sheet 5
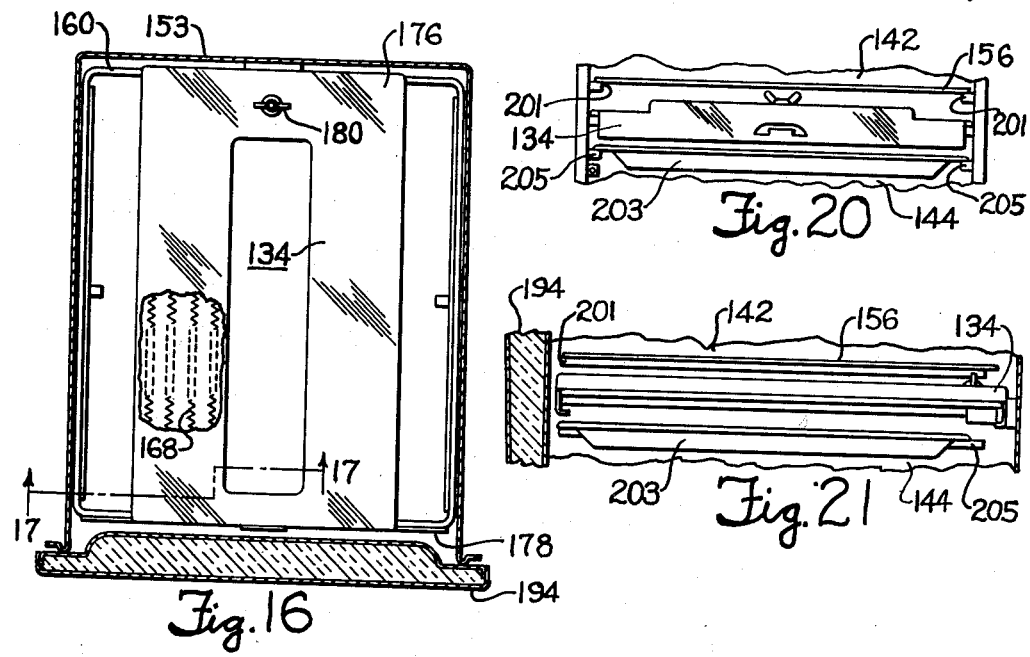
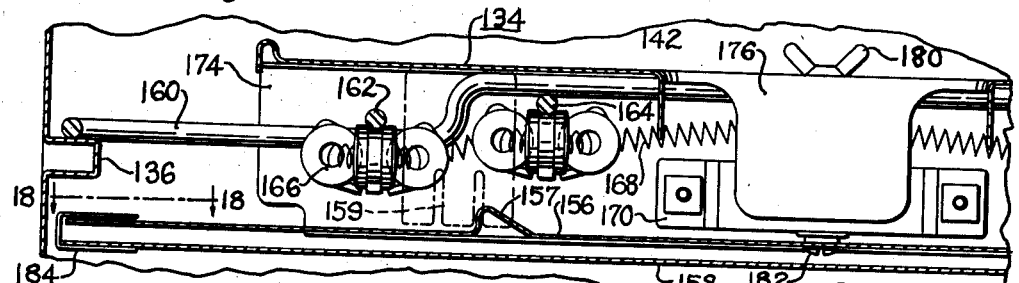
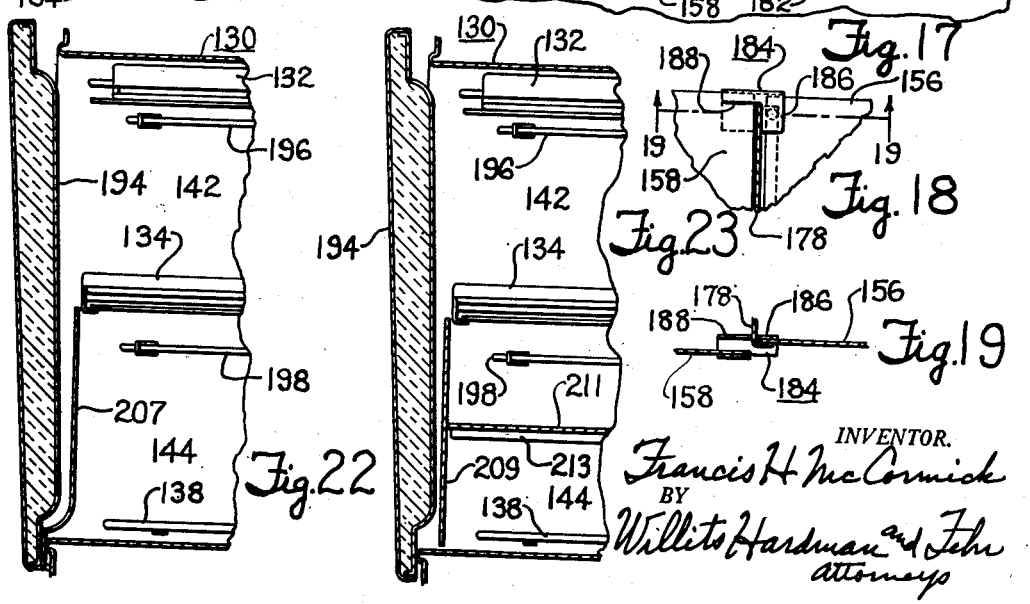
INVENTOR.
Francis H. McCormick
BY
Willits, Hardman and Fehr
attorneys Patented Feb. 2, 1954

2,668,222

UNITED STATES PATENT OFFICE 2,668,222

DOMESTIC APPLIANCE

Francis H. McCormick, Dayton, Ohio, assignor to General Motors Corporation, Dayton, Ohio, a corporation of Delaware Application March 3, 1951, Serial No. 213,721

14 Claims. (Cl. 219—35)

This application is a continuation in part of my copending application S. N. 105,105, filed July 16, 1949.

This invention relates to domestic appliances and more particularly to electric ovens.

My invention is an improvement over previous domestic electric ovens, in that two independent and dissimilar cooking operations such as broiling and baking may be performed in the single oven heretofore used on domestic electric ranges. Also, two independent baking operations, at different temperatures if desired, may be performed in the oven. Also, two independent broiling operations may be performed. Also, when necessary, my improved oven may be adjusted to receive relatively large roasts such as fowls which require a relatively large cooking compartment.

Accordingly, my improved domestic range oven is provided with upper, intermediate and lower heaters arranged to produce two sub-compartments closed by a single common door and adapted to cook foods under independent conditions. The intermediate heater may be removed from its intermediate position to provide a single relatively large compartment capable of cooking relatively large roasts. The two sub-compartments are controlled by two independent thermostats, one of which is used to control the single large compartment. The single door is constructed to open and close both sub-compartments, and, if desired, means are provided to close one sub-compartment while partially opening the other. Preferably the upper sub-compartment is arranged for baking, roasting and broiling, while the lower sub-compartment may be used for baking, broiling or warming.

An object of this invention is to provide an oven having three or more spaced heaters to produce two or more independent food heating spaces therebetween, with the intermediate heater movable to provide a single relatively large compartment.

Another object of this invention is to provide an oven having upper, intermediate and lower heaters for said oven to produce two independent food heating spaces therebetween, with power controls for said heaters effective to produce independent thermostatically controlled cooking conditions in the two spaces when the intermediate heater is in its central position, and effective to provide a unitary thermostatic control when the intermediate heater is moved to provide a single relatively large compartment.

Another object of this invention is to provide upper, intermediate and lower heaters for an oven to produce two food heating spaces therebetween, with the intermediate heater being movable to a lower position to produce a relatively large food heating space, capable of receiving large articles to be cooked.

Another object of this invention is to provide upper, intermediate and lower heaters, with thermostatic controls such that the upper space may be thermostatically controlled independently of the lower space.

Another object of this invention is to provide an oven with upper, intermediate and lower heaters, with the intermediate heater being movable from a relatively central position to a lower position adjacent the lower heater, with thermostatic controls and power connections such that a thermostat controls the upper and intermediate heaters and another thermostat controls the lower heater, the power to the lower heater being open circuited when the intermediate heater is in the lower position.

Another object of this invention is to provide an oven with upper, intermediate and lower heaters and with a door having a closed position, a slightly ajar position, and a fully open position. The door is effective to close both spaces when in closed position, to close one space and slightly open another space when in the slightly ajar position, and to open both spaces when in the fully open position.

Another object of this invention is to provide an oven having upper, intermediate and lower heaters for said oven to produce two independent food heating spaces therebetween, and a single door effective to close both spaces when in the fully closed position, a means for holding the door partially open as is desirable when broiling in the upper space, and an auxiliary closure to close the lower of said two spaces when door is partially open to permit baking operations in the lower space while broiling at the same time in the upper space.

Another object of this invention is to provide an intermediate heater with a resistance element and a substantially imperforate partition extending below said resistance element substantially throughout the horizontal extent of the oven to form two thermally separated spaces in the oven.

Further objects and advantages of the present invention will be apparent from the following description, reference being had to the accompanying drawings, wherein a preferred form of the present invention is clearly shown.

In the drawings:

Fig. 1 is a vertical cross-section, along the line

1—1 of Fig. 2, showing an oven embodying features of my invention;

Fig. 4 is a vertical cross-section taken along the line 4—4 of Fig. 1;

Fig. 5 is an enlarged cross-sectional view of a power connector for use with the intermediate heater at its lower position, and showing connections with the lower heater;

Fig. 6 is a vertical cross-section along the line 6—6 of Fig. 5;

Fig. 7 is a vertical cross-section along the line 7—7 of Fig. 5;

Fig. 8 is a wiring diagram showing the connections and controls for the heaters;

Fig. 9 is a view similar to Fig. 4, showing additionally the baffle which may be used above the resistance;

Fig. 10 is a front view with the door open of an oven showing a modified form of my invention;

Fig. 11 is a vertical sectional view of the oven shown in Fig. 10 with the shelf supports omitted for clarity;

Fig. 12 is a sectional view of the intermediate independent heating unit taken along the line 12—12 of Fig. 10;

Fig. 13 is a sectional view taken along the line 13—13 of Fig. 12;

Fig. 14 is a view of the oven with intermediate independent electric heating unit in its lower position providing a single full-size oven compartment;

Fig. 15 is a fragmentary enlarged vertical sectional view particularly showing the inner sub-door for independently closing the lower sub-compartment;

Fig. 16 is a sectional view taken along the line 16—16 of Fig. 10;

Fig. 17 is an enlarged sectional view of the intermediate heating unit take along the line 17—17 of Fig. 16.

Fig. 18 is a fragmentary sectional view taken along the line 18—18 of Fig. 17;

Fig. 19 is a fragmentary sectional view taken along the line 19—19 of Fig. 18;

Fig. 20 is a front view of the intermediate heating unit arranged for broiling;

Fig. 21 is a side view of the intermediate heating unit arranged for broiling;

Fig. 22 is a fragmentary vertical sectional view of the front part of the oven showing another form of the inner sub-door; and Fig. 23 is a view similar to Fig. 20 showing another form of inner sub-door.

My invention may include an oven 10, having upper, intermediate and lower heaters 11, 12, and 13, respectively, to form food cooking spaces or sub-compartments 14 and 15 above and below the intermediate heater. These food cooking spaces 14 and 15 are capable of maintaining different temperatures and different conditions of heating, so that baking, broiling and/or warming may be accomplished simultaneously and independently within the two cooking spaces in the oven.

Figure 1:
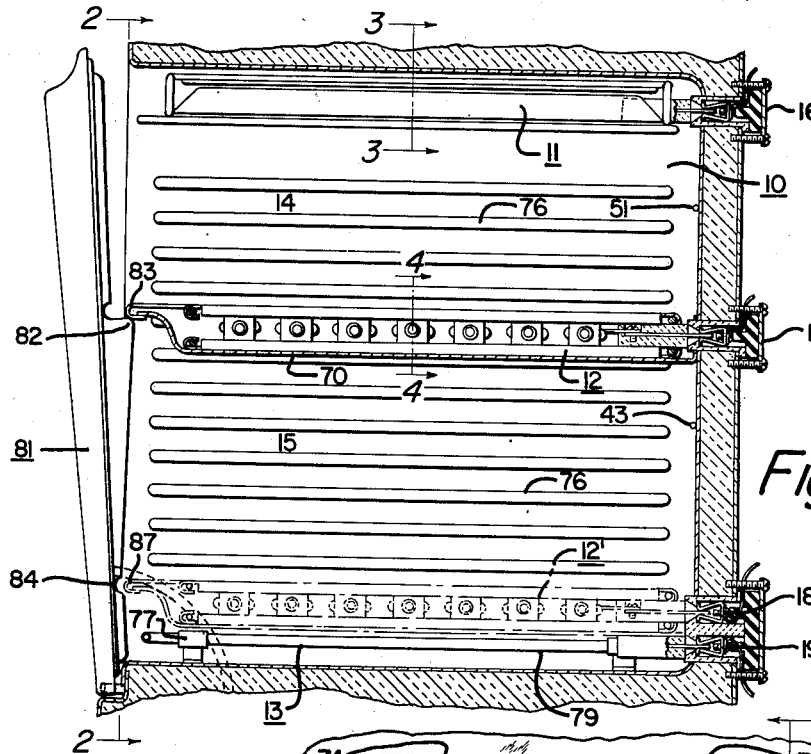
Figure 2:
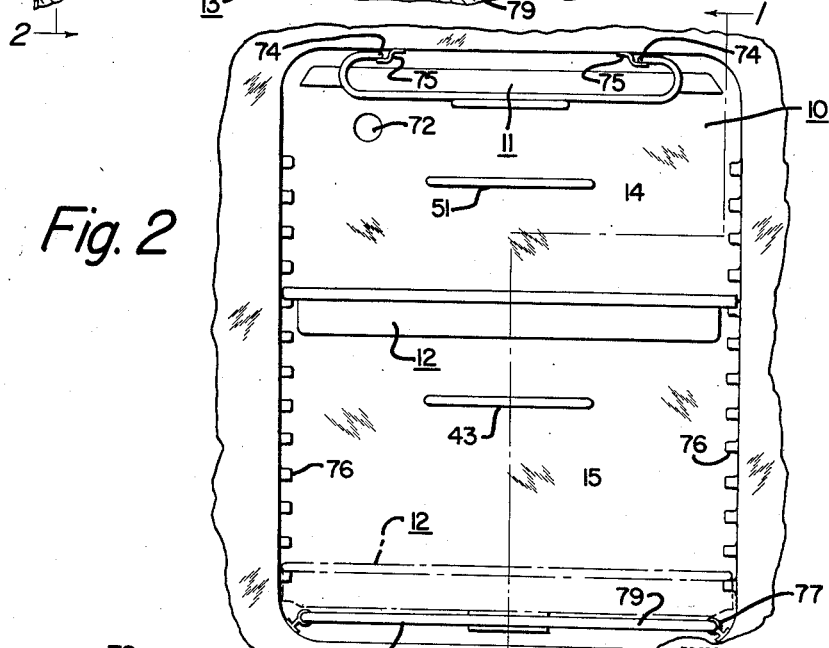
Fig. 2 is a vertical cross-section taken along the line 2—2 of Fig. 1.
Figure 3:
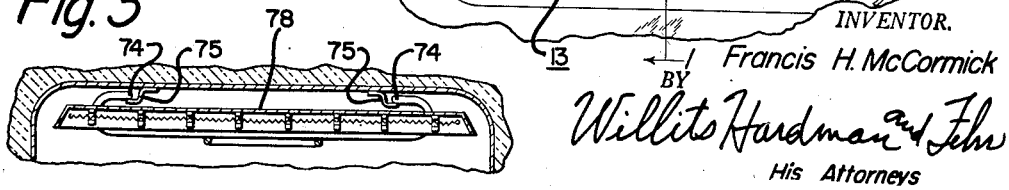
Fig. 3 is a vertical cross-section taken along the line 3—3 of Fig. 1.

The intermediate heater 12 is movable from a relatively central position, as indicated in full lines in Fig. 1, to a lower position 12', as indicated in dotted lines in Fig. 1. The lower position preferably is adjacent the lower heater 13, to form a single large compartment substantially equal in volume to the previous separate compartments 14 and 15, and capable of roasting a large turkey or the like.

Power connectors 16, 17, 18, and 19 are provided. Connectors 16 and 19 provide power for the upper and lower heaters 11 and 13 respectively. They may be of any suitable bayonet type which allow the heaters to be removed for cleaning, repairing and the like. The connectors 17 and 18 are somewhat similar to connectors 16 and 19; but are provided with means effective to allow all three heaters to be energized when heater 12 is in its relatively central position, and effective to energize only the upper heater 11 and the intermediate heater 12, and to disconnect lower heater 13, when the intermediate heater is in its lower position.

In order to allow the intermediate heater 12 to control the connections to the lower heater 13, the connector 18 may be constructed as shown in Figs. 5, 6 and 7, and may include the power line bayonet slots 20 and 21 and the neutral bayonet slot 22. The slots 20 and 21 may be connected to the power lines L₁ and L and receive the power prongs 20' and 21' of heater 12 while the connector 22 may be connected to the neutral wire or to ground as is usual and receives the ground prong 25 of the heater 12. In addition, the neutral connector 22 is provided with an insulated opening 23 through which the extension 24 of the heater ground prong 25 may project. The extension 24 is adapted to engage an insulated cap 26 of a switch blade 27, and to open the contacts 28, 29, which are adapted to close when the prong 25 is removed. Thus the lower heater is disconnected at contacts 28 and 29 when the intermediate heater is in its lower position; but is connected when the intermediate heater is removed from its lower position.

One of the prongs 30 of the lower heater 13 is connected to the line L through the medium of bayonet slot 31, thermostat contact 42, and line 31'. The other prong 32 is connected to the line L, through the bayonet slot 33, thermostat contact 42, line 34, contacts 29, 28, blade 27 and line 36. Thus, when the heater 12 is inserted in the connector 18, the power connection to the lower heater 13 is broken by the opening of contacts 28 and 29; but when the heater 12 is removed from the connector 18, and is inserted in the connector 17, the lower heater 13 is connected to the power line L₁ by the closing of contacts 28 and 29.

The lower heater 13 is controlled by a thermostatic switch 40 which may include the usual snap-acting mechanism 41 capable of opening and closing the contacts 42 in response to temperature variation within the space 15. These variations act upon the bulb 43, connected by the tube 44 with the snap-acting mechanism 41, as is well known. The mechanism 41 may be adjusted by the knob 45, capable of adjusting the mechanism to be responsive to various temperatures, as selected by the setting of the knob 45, and capable of maintaining the contacts 42 fully open in the "off" position, regardless of oven and room temperatures.

Thermostatic means 50 for controlling the temperature within the space 14 may also be provided, and this may include a thermostatic construction substantially identical with that disclosed in patent to M. E. Fry, No. 2,388,839, granted November 13, 1945. Briefly stated, it may include a thermostatic bulb 51 connected by tube 52 to a diaphragm or bellows 53, which opens and closes the contact 54 by a snap-acting mechanism 55. The temperature setting may be adjusted by means of knob 56 connected to a shaft 57 which has a threaded connection with the sleeve 58 axially to adjust the bellows 53. The knob 56 may have an "off" position, a "broil" position, and a plurality of temperature positions, which are the "bake" positions. The highest temperature is the "broil" position. The shaft 57 is provided with selector cams 58 and 59, which open and close the contacts 60 and 61 at proper settings of the knob 56. In the "off" position contacts 60, 61 and 54 are open. In the "broil" position contacts 61 and 54 are closed, and contacts 60 are open. This energizes the upper heater 11 at full capacity, as described in the Fry patent. If the knob 56 is turned to any of the temperature positions, except the broil position, the contacts 54 and 60 are closed, and the contacts 61 are open, thus energizing the intermediate heater 12 at full capacity, and the upper heater 11 at reduced output, these heaters being subsequently cycled by the thermostatic opening and closing of the contacts 54 in response to temperatures acting on the bulb 51. If the knob 56 is first turned to broil, and then back to some baking position, the upper heater 11 and intermediate heater 12 are both energized at full capacity until the space 14 reaches the desired temperature. This is accomplished by the closing of contacts 54 and 61 in the broil position, the contacts 61 being maintained closed by the holding solenoid 62 after the knob 56 is moved to the bake position, the contacts 60 being closed in the bake position. Therefore, for one heating cycle, both heaters 11 and 12 are at full capacity, the cycle being terminated by the opening of contacts 54, which opening de-energizes the solenoid 62 and allows the heater 11 thereafter to be re-energized at reduced output, with the other heater at full capacity, as more fully described in the Fry patent.

When the intermediate heater 12 is removed from its central position, and inserted in its lower position, the prong 25 moves the switch blade 27 to open position, thus disconnecting the lower heater 13 from the power line L₁. The thermostat 50 continues to control the intermediate heater 12 exactly the same as it did in its central position, by virtue of the lines 65 and 66 which connect the slots 20 and 21 to the thermostatic control 50 exactly the same as the lines 67 and 68 connect the bayonet slots 20' and 21' of the intermediate connector 17.

Preferably the intermediate heater 12 is provided with an imperforate partition 70 extending below the resistance element 71 substantially throughout the horizontal extent of the oven, to form the two substantially thermally separated spaces, 14 and 15. Some slight opening (not shown) may be provided in the partition 70 which is only sufficiently large to allow the vapors to flow through said opening from the sub-compartment 15 to the sub-compartment 14, from whence they may flow through the vent 72, which vent may be of the usual construction. This opening should not be sufficiently large to provide any substantial thermal exchange.

If desired, the intermediate heater 12 may be provided with a distributing baffle 73 above the resistance element 71 as indicated in Fig. 9, which baffle may be substantially identical with the baffle 69 disclosed in my Patent 2,314,592, granted March 23, 1943.

The heaters may be supported by any suitable means. Thus the upper heater 11 may include longitudinal wire bars 74 slidable in brackets 75, which are supported at the top of the oven. The intermediate heater 12 may be supported on various shelf brackets 76 formed in the sides of the oven, for reception of shelves, heaters, and the like, these being properly located for reception of the heater 12 both in its central and lower positions. The lower heater 13 may be slidably supported on longitudinal brackets 77.

The upper heater may be provided with a reflector 78, to reflect the rays downwardly.

The lower heater may be formed of an outer tube 79 within which is placed the resistance 80, embedded in impacted insulation, a well known construction.

The door 81 has a fully closed position, a slightly ajar position, and a fully open position. The mounting, hinging and supporting of the door may be of any well known construction, for example, such as is disclosed in my Patent 2,308,768, granted June 19, 1943. The door lining may be provided with a bulging portion 82 providing a sub-door adapted to cooperate with the front lip 83 of the partition 70 of the heater 12 in such a manner that, when the door is in the slightly ajar position, as illustrated in Fig. 1, the sub-compartment 15 is substantially closed, while the sub-compartment 14 is maintained slightly open. Under these conditions, the sub-compartment 14 may be used for broiling, and the temperature within the sub-compartment is thus prevented from rising sufficiently to cycle the contacts 54. At the same time the sub-compartment 15 may be used for baking or warming, because of its substantially closed condition, produced by the sub-door bulge 82 and lip 83. When the door 81 is in its fully open position, which may be substantially horizontal, both sub-compartments 14 and 15 are fully open, as is evident. When the door 81 is in its fully closed position, with its upper part substantially against the upper edge of the oven, then both sub-compartments 14 and 15 are substantially closed, under which conditions either or both of the sub-compartments may be used for either baking or warming, as desired. The sub-door bulging portion 82 extends laterally substantially from one side wall of the oven to the other side wall, to substantially seal the sub-compartment 15 when the door is slightly ajar.

In the operation of my invention, if it is desired to broil in the compartment 14, while simultaneously baking and/or warming in the sub-compartment 15, with the intermediate heater in central position, the knob 56 is turned to "broil," and the knob 45 is turned to the desired baking or warming temperature. The article to be broiled is placed on a shelf (not shown) within the sub-compartment 14, while the article to be baked is placed on a shelf (not shown) within the compartment 15. The door 81 is placed in the slightly ajar position, as shown in Fig. 1. If it is desired to remove or insert articles in either of the compartments 14 or 15, the door 81 is placed in its fully open position. If it is desired to bake and/or warm in both of the sub-compartments 14 and 15, the knobs 56 and 45 are adjusted to the desired baking conditions, articles are placed in both sub-compartments 14 and 15, and the door 81 is placed in its fully closed position.

Should it be desired to cook a very large article, the intermediate heater 12 is moved to its lower position to provide a single full size oven compartment, and the knob 56 is adjusted to the desired condition. The article is supported on proper shelving (not shown) at the desired elevation, and the door 81 is placed either in the slightly ajar position shown in Fig. 1, for broiling or in the fully closed position for baking, roasting or warming, the notch 84 in the door permitting it to be fully closed without abutting against the lip 83. Under such conditions heaters 11 and 12 are controlled by thermostat 50.

A companion application for Domestic Appliance, S. N. 105,106, filed July 16, 1949, now abandoned, shows and claims a modification of this invention.

This application is similarly related to S. N. 218,413, filed March 30, 1951, which is a continuation in part of S. N. 105,106.

It is obvious that either of the sub-compartments 14 and 15 may be used alone, without using the other sub-compartment, if desired.

Referring now more particularly to Figs. 10 and 11 there is shown an oven 130 provided with a broil type top independent electric heating unit 132 supported upon the shelf supports 133. A removable intermediate independent electric heating unit 134 is supported upon the shelf supports 136 and a bottom independent electric heating unit 138 is supported upon the shelf supports 140. In the position shown in Fig. 10 the intermediate heating unit 134 divides the oven 130 into an upper sub-compartment 142 and a lower sub-compartment 144. As shown in Fig. 14, the intermediate heater 134 is removable from the position shown in Figs. 10 and 11 and is inserted into the lower position shown in Fig. 14, where it rests upon the shelf supports 146.

Terminal connectors 148, 150, 152 and 154 are provided upon the back wall 153 of the oven 130. These connectors are similar to the terminal connectors 16 to 19 inclusive of Figs. 1 to 9 and connect to an electrical energizing circuit like that shown in Figs. 5 and 8. When the intermediate heating unit 134 is moved from the position shown in Figs. 10 and 11 to the position shown in Fig. 14, it is disconnected from the terminal 150 and is inserted into the terminal 152 which is made like the terminal 18 in Figs. 1 to 9 so that the bottom heating unit 138 is deenergized as provided for in Fig. 8. However, if the combined heating effect intermediate heating unit 134 and the bottom heating unit 138 is not excessive, it may not be necessary to deenergize the unit 138.

The bottom heating unit 138 may be of the tubular sheathed type. The top heating unit 132 and the intermediate heating unit 134 are of the open coil type similar to that shown in Figs. 1 to 9. A broil pan may be placed immediately beneath the top unit 132 for broiling.

To make it possible to broil in the upper sub-compartment while the lower sub-compartment is in use for baking, there is provided beneath the heating unit 134 a sheet metal partition 156 and connected to the partition is a pull-out and fold-down type of drop sub-door 158. The intermediate heating unit 134 is provided with a heavy rectangular wire frame 160, the edges of which rest directly upon the side shelf supports 136. The frame 160 is provided with pairs of longitudinal wire members 162 and 164. Each of these pairs of wire members support a plurality of insulating spools 166 through which extend a continuous coiled bare electric heating wire 168. This heating wire is connected in the terminal block 170 to the prongs 172 which provide the connection with the terminal blocks 150 and 152. The terminal block 170 is provided with a channel supporting member 174.

Extending over the heating wire 168 is a substantially flat baffle 176 provided with flanged central opening. This baffle 176 preferably is similar to the baffle 60 disclosed in my Patent 2,314,592, granted March 23, 1943. The front edge of the baffle 176 is folded downwardly and rearwardly to provide a front face 178 which encloses and rests upon the front end of the wire frame 160. The rear end of the baffle 176 is fastened to the terminal block 170 by the wing nut 180. The sheet metal partition 156 rests upon the in-turned ledge upon the front face 178 of the baffle 176 and the in-turned ledge provided upon the rear channel supporting member 174. The head 182 of the main screw extending through the terminal block 170 is received within an aperture in the sheet metal partition 156 to prevent lateral movement of the partition 156.

Preferably, the partition 156 is placed upon the ledge of the channel member 174 and over the head 182 of the screw extending through the terminal block 170 before the baffle 176 is placed in its position over the wire frame 160 with its ledge beneath the front edge of the partition 156 and secured to the terminal block 170 by the wing nut 180. The partition 156 is provided with reinforcing ribs 157 the front ends of which engage the projections 159 extending rearwardly from brackets fastened to the front edge of the wire frame 160 to insure centering and to prevent shifting of the partition 156 relative to the wire frame 160. The rear or upper edge of the inner drop sub-door is provided with a channel shaped bracket 184 which rests on the opposite side edges of the sheet metal partition 156. The configuration of this bracket 184 is better shown in Figs. 18 and 19 and particularly includes a projection 186 which rides upon the opposite side edges of the sheet metal partition 156. The front face 178 is of slightly lesser width than the sheet metal partition 156 permitting the flanged portion 188 to pass the edges of the front face 178 so as to allow the door 158 to be folded down to the position shown in Fig. 15.

The operation of this door is similar to that in most sectional bookcases in which the door pulls out horizontally and then folds down. To return the door to the position shown in Fig. 11, the handle 190 is lifted up until the door 150 is horizontal and then is pushed back until the handle 190 can be inserted into the aperture 192 provided for it in the front face 178 of the baffle member 176. When the door 158 is in its lower position, it effectively closes the lower sub-compartment 144.

The oven is provided with a single horizontally opening common outer door 194. The mounting, hinging, and supporting of the door may be of any well known construction, for example, as disclosed in my Patent 2,308,768, granted June 19, 1943. The door, as illustrated in said patent, has a partly open station for broiling purposes as illustrated particularly in Fig. 11. This permits the upper compartment 142 to be used for broiling purposes while, if the door 158 is pulled down as shown in Fig. 15, the lower sub-compartment 144 may be used at the same time for baking purposes.

For the purpose of providing satisfactory independent controls for each sub-compartment the upper sub-compartment 142 is provided with a thermostat bulb 196 corresponding to the thermostat 51 in Figs. 1 to 9 while the lower sub-compartment 144 is provided with a thermostat 198 corresponding to the thermostat bulb 43 in Figs. 1 to 9.

When it is desired to use both compartments for baking the single outer door 194 is moved to the closed position shown in dot-dash lines in Fig. 11 and in full lines in Fig. 16. It is not necessary that the drop sub-door 158 be moved to the position shown in Fig. 15 for this operation but the independence of the two sub-compartments will be improved by lowering the door 158. When it is desired to use the oven as a large single compartment oven, the intermediate heating unit 134 is moved to the position shown in Fig. 14. As mentioned before, in accordance with the arrangements shown in Figs. 1 to 9, this will de-energize the lower heating unit 138 and the heating will be performed principally by the intermediate heating unit 134 with a small amount of top heat being provided by the top broil unit 134 under the control of the thermostat bulb 196.

If it should be desired to broil in both the upper sub-compartment 142 and the lower sub-compartment 144 at the same time, the partition 156 and the door 158 may be removed from the intermediate heating unit 132. The sheet metal partition 156 is then placed on the shelf guide 201 immediately above the intermediate position of the intermediate heating unit 134 as shown in Figs. 20 and 21. A broil pan 203 is placed upon the shelf guides 205 immediately beneath the intermediate heating unit 134. A broil pan is also placed immediately beneath the top broil unit 134 as is customary. With this arrangement, broiling can be accomplished in both compartments simultaneously.

In Fig. 22 there is provided a door arrangement in which the inner sub-door 207 is pivoted upon the same pivot pins as is provided for the single common outer door 194. This inner sub-door 207 may rest against the front face of the intermediate heating unit 134 to effectively close the lower sub-compartment 144. When the intermediate heating unit 134 is placed in its lowermost position as illustrated in Fig. 14, the inner sub-door 207 may be in contact with the inner surface of the single common outer door 134.

In Fig. 23 the inner sub-door 209 is fastened directly to the front edge of a shelf member 211 which is supported upon a pair of shelf guides 213. This sub-door 209 cooperates with the intermediate heating unit 134 as well as the walls of the oven compartment to substantially close the oven compartment 144 in the same manner as the doors 207, 158 and the sub-door 82.

While the form of embodiment of the invention as herein disclosed, constitutes a preferred form, is it to be understood that other forms might be adopted, as may come within the scope of the claims which follow.

What is claimed is as follows:

1. In combination: an oven; upper, intermediate and lower heaters for said oven having two food heating spaces therebetween; and a door having a closed position, a slightly ajar position and a fully open position and extending as a rigid continuous impervious unit over the entire front of both spaces for substantially closing both of said spaces when in closed position, and having means for substantially closing one of said spaces while maintaining slightly open the other of said spaces in the slightly ajar position, and for maintaining open both of said spaces in said fully open position.

2. In combination: an oven; upper, intermediate and lower heaters for said oven having two food heating spaces therebetween; a door for opening and closing said spaces having a closed position, a slightly ajar position and a fully open position; one of said heaters and said door having means for substantially closing one of said spaces while maintaining slightly open the other of said spaces when said door is in slightly ajar position; said door substantially fully closing and fully opening said spaces in the closed and fully open positions respectively.

3. An oven including walls enclosing an oven compartment, a horizontal partition means within said compartment intermediate the top and bottom dividing said compartment into upper and lower sub-compartments, door means including a common door extending as a single rigid impervious continuous unit over the entire front of the compartment for closing the entire compartment and having a partly open station for broiling purposes, said door means including means for closing only one of said sub-compartments while said common door is in said partly open station.

4. An oven including walls enclosing an oven compartment, a horizontal partition means within said compartment intermediate the top and bottom dividing said compartment into upper and lower sub-compartments, door means including a common door for closing the entire compartment and having a partly open station for broiling purposes, said common door having a bulge formation forming a sub-door cooperating with the partition means and the walls for substantially closing one of said sub-compartments when in said partly open station.

5. An oven including an oven compartment, upper and lower electric heating means for said compartment, a removable horizontal partition means for dividing said compartment into upper and lower sub-compartments, an outer door for opening and closing the entire oven compartment, and a movable inner door cooperating with said partition means and extending over only a part of the entrance to said oven compartment for opening and closing only one of said sub-compartments.

6. An oven including an oven compartment, upper and lower electric heating means for said compartment, a removable horizontal partition means for dividing said compartment into upper and lower sub-compartments, an outer door for opening and closing the entire oven compartment, and a movable inner door cooperating with said partition means and extending over only a part of the entrance to said oven compartment cooperating with said partition means for opening and closing only said lower sub-compartment.

7. An oven including an oven compartment, upper and lower electric heating means for said compartment, a removable horizontal partition means for dividing said compartment into upper and lower sub-compartments, an outer door for opening and closing the entire oven compartment, and an inner door of the slide out and drop down type extending over only a part of the entrance of said oven compartment and cooperating with said partition means for closing only said lower sub-compartment and retractable horizontally beneath the partition means to open the lower sub-compartment.

8. An oven including an oven compartment, upper and lower electric heating means for said compartment, a removable horizontal partition means for dividing said compartment into upper and lower sub-compartments, an outer door for opening and closing the entire oven compartment, and an inner door extending over only a part of the entrance of said oven compartment and having its upper edge portion slidably and rotatably mounted upon said partition means so as to slide out and fold down to close only said lower sub-compartment, said inner door having means for supporting its lower edge portion upon said partition means to support said door parallel to said partition means.

9. An oven including an oven compartment, upper and lower electric heating means for said compartment, a door for closing said oven compartment, a removable intermediate heating means having an intermediate location between the upper and lower heating means, a movable horizontal partition means for dividing said oven compartment into upper and lower sub-compartments, and a retractable outwardly and downwardly independently movable inner closure for only said lower sub-compartment movable outwardly and downwardly from open to closed positions independently of said door.

10. An oven including an oven compartment, upper and lower electric heating means for said compartment, a door for closing said oven compartment, a removable intermediate heating means having an intermediate location between the upper and lower heating means, a movable horizontal partition means for dividing said oven compartment into upper and lower sub-compartments, and an inner closure for said lower sub-compartment pivoted to said door and movable to open position when said door is fully open and to close position when said door is partly or fully closed.

11. An oven including an oven compartment, upper and lower electric heating means for said compartment, a door for closing said oven compartment, a removable intermediate heating means having an intermediate location between the upper and lower heating means, a movable horizontal partition means, and means for supporting said partition means in horizontal position alternately immediately above or below said intermediate heating means to divide said oven compartment into sub-compartments, and an inner door smaller than said first mentioned oven compartment door cooperating with said partition means for closing only one of said sub-compartments.

12. An oven including walls enclosing an oven compartment, an upper heating means within said compartment primarily for broiling, a lower heating means within said compartment, an intermediate removable heating means having a horizontal partition means associated with it dividing the compartment into upper and lower sub-compartments, door means including a common door pivoted adjacent its lower edge extending as a single rigid impervious continuous unit over the entire front of the compartment and having a partly open station for broiling with the upper heating means in the upper sub-compartment, said door means including means cooperating with said horizontal partition means for closing said lower sub-compartment when the common door is in said partly open station.

13. An oven including an oven compartment, upper and lower electric heating means for said compartment, a door for closing said oven compartment, a removable intermediate heating means having an intermediate location between the upper and lower heating means, a movable horizontal partition means for dividing said oven compartment into upper and lower sub-compartment, and an independently movable inner closure having an area substantially equal to the area of the opening of said lower sub-compartment for closing only said lower sub-compartment, said inner closure being movable to open and closed positions independently of said door.

14. An oven including an oven compartment, upper and lower electric heating means for said compartment, a door for closing said oven compartment, a removable intermediate heating means having an intermediate location between the upper and lower heating means, a movable horizontal partition means for dividing said oven compartment into upper and lower sub-compartments, and a removable inner closure having an area substantially equal to the area of the opening of said lower sub-compartment for closing only said lower sub-compartment removable to open and restorable to close said lower sub-compartment independently of said door.

FRANCIS H. McCORMICK.

References Cited in the file of this patent

UNITED STATES PATENTS

| Number | Name | Date |
|---|---|---|
| 1,208,213 | Richmond | Dec. 12, 1916 |
| 1,209,326 | Nye | Dec. 19, 1916 |
| 1,355,868 | Trenkamp | Oct. 19, 1920 |
| 1,375,801 | Ross | Apr. 26, 1921 |

FOREIGN PATENTS

| Number | Country | Date |
|---|---|---|
| 117,996 | Great Britain | Aug. 15, 1918 |
| 600,388 | Great Britain | Apr. 7, 1948 |